US012605730B2

(12) United States Patent
Tu

(10) Patent No.: US 12,605,730 B2
(45) Date of Patent: Apr. 21, 2026

(54) SPRAY HEAD CAPABLE OF SPRAYING CONTINUOUSLY

(71) Applicant: Zhejiang JM Industry Co., Ltd., Yuyao City (CN)

(72) Inventor: Xufeng Tu, Yuyao City (CN)

(73) Assignee: Zhejiang JM Industry Co., Ltd., Yuyao (CN)

( * ) Notice: Subject to any disclaimer, the term of this patent is extended or adjusted under 35 U.S.C. 154(b) by 113 days.

(21) Appl. No.: 18/897,604

(22) Filed: Sep. 26, 2024

(65) Prior Publication Data

US 2026/0021502 A1 Jan. 22, 2026

(30) Foreign Application Priority Data

Jul. 22, 2024 (CN) ........................ 202421744272.8

(51) Int. Cl.
*B05B 11/10* (2023.01)

(52) U.S. Cl.
CPC ...... *B05B 11/1038* (2023.01); *B05B 11/1057* (2023.01); *B05B 11/109* (2023.01)

(58) Field of Classification Search
CPC B05B 11/1038; B05B 11/1057; B05B 11/109
USPC ...................................................... 222/383.1
See application file for complete search history.

(56) References Cited

U.S. PATENT DOCUMENTS 4,591,077 A * 5/1986 Corsette .............. B05B 11/1095 222/335
5,622,317 A * 4/1997 Foster ................. B05B 11/1011 239/333
5,711,461 A * 1/1998 Foster ................. B05B 11/0044 222/383.1
2007/0215648 A1* 9/2007 Foster ................. B05B 11/1077 222/383.1
2017/0348716 A1* 12/2017 Fujiwara ............. B05B 11/1011
2023/0226567 A1* 7/2023 Liang .................. B05B 11/0032 222/383.1

* cited by examiner

*Primary Examiner* — Jeremy Carroll
(74) *Attorney, Agent, or Firm* — Wang Law Firm, Inc.

(57) ABSTRACT

The spray head capable of spraying continuously comprises a main body having a liquid passage; a head cap; a spray one-way valve; an operating handle; and a pump. The liquid passage comprises a transverse passage and a vertical passage which communicate with each other. A pressure continuation sealing seat capable of moving up and down is disposed inside a sleeve, a pressure continuation chamber is defined on a top of the pressure continuation sealing seat. The pressure continuation spring is supported between the pressure continuation spring seat and the pressure continuation sealing seat, driving the pressure continuation sealing seat to move upward so as to continuously extrude liquid in the pressure continuation chamber out to the transverse passage. The present invention is simple and reasonable in structure, convenient to assemble, low in cost without additional housing disposed outside the main body, and good in universality.

11 Claims, 4 Drawing Sheets

SPRAY HEAD CAPABLE OF SPRAYING CONTINUOUSLY

TECHNICAL FIELD OF THE INVENTION

The present invention relates to a field of daily cosmetics, and in particular to a spray head capable of spraying continuously, which is suitably used on cosmetic bottles.

BACKGROUND OF THE INVENTION

Cosmetics refer to chemical industrial products or fine chemical products that are spread on any part (e.g., skin, hair, nail, lip and teeth, etc.) of a surface of the human body, by smearing, spraying or other similar methods, for the purpose of cleaning, maintaining, beautifying, embellishing and changing the appearance, or correcting the odor of the human body, and keeping in the good condition. Many kinds of cosmetics are existed, such as liquid, powdery and pasty cosmetics. Among them, emulsion or latex cosmetics, such as skin moisturizer and foundation cream, are generally packaged in special bottles. The emulsion is squeezed from a spray head of special bottles by pressing. However, for some cosmetics, they need to be sprayed continuously when in use.

Most common sprayers spray once by pulling an operating handle, but cannot spray continuously, thus affecting the spraying effect.

Upon examination, a Chinese patent CN218432669U (patent No.: CN202222266361.3) disclosed a liquid spraying pump, which comprises a pump body with a spray outlet passage, a cover connected to a container, a spray head, a spray outlet one-way valve, a main piston rod, and an operating handle for driving the main piston rod to move up and down. The spray outlet passage comprises a transverse passage in an upper portion of the pump body; a main piston pressurization chamber is connected to the transverse passage through a pressurization valve and its outlet; a front end of the transverse passage communicates with the spray outlet one-way valve on the pump body; a pressure continuation sealing seat capable of moving left and right is arranged in the transverse passage; a pressure continuation chamber is defined between the pressure continuation sealing seat and a front portion of the transverse passage; the pressure continuation chamber communicates with the spray outlet one-way valve through the transverse passage; and, a pressure continuation spring for keeping the volume of the pressure continuation chamber to be reduced is arranged between the pressure continuation scaling seat and a rear portion of the transverse passage. Under such design, by increasing a space for liquid storage, the spraying volume is increased, the time for continuous spraying is long. However, if the space for liquid storage is increased, the volume of the whole bottle will be increased, and it is inconvenient to carry. Moreover, a housing should be arranged outside the pump body, and the housing needs to be assembled manually, so it is troublesome in manufacture. In addition, the to-be-connected bottles are also limited for matching with the spray head so that the spray head cannot be used universally.

SUMMARY OF THE INVENTION

It is an object of the present invention to provide a spray head capable of spraying continuously which is simple and reasonable in structure and convenient to assemble and is capable of spraying continuously.

For achieving the above object, the spray head capable of spraying continuously comprises a main body having a liquid passage with an inlet and an outlet; a head cap connected to the main body; a spray one-way valve for discharging liquid; an operating handle; a cover connected to the main body for connecting to an external bottle; a pump; a pressurization valve; a sucker; a cylinder; a pressure continuation spring having an upper portion and a lower portion; wherein, the liquid passage comprises a transverse passage and a vertical passage which communicate with each other, the head cap is located at the outlet of the liquid passage which forms a front end of the transverse passage, the spray one-way valve is located inside the front end of the transverse passage and is adjacent to the head cap, the pressurization valve is located inside the transverse passage to make the vertical passage communicate with the transverse passage; the pump is disposed inside the main body below a bottom of the vertical passage and the cover is connected to the pump, the pump has a main operating valve and a spring seat both disposed inside the pump, the main operating valve is below the spring seat, the sucker is connected to a bottom of the pump; the cylinder is disposed inside the main body below the transverse passage, a main piston having an outer surface and an inner surface is transversely movably disposed on the cylinder, the operating handle resists against the outer surface of the main piston, a spring is supported between the inner surface of the main piston and the cylinder so as to move the main piston forward and to resist against the operating handle, the cylinder has a through hole which communicates with the pump and the vertical passage; the upper portion of the pressure continuation spring is located inside the vertical passage and the lower portion of the pressure continuation spring is supported on the spring seat; a sleeve having a bottom is disposed inside the vertical passage and behind the transverse passage, a top of the pressure continuation spring seat is hermetically sleeved with the bottom of the sleeve; a pressure continuation sealing seat capable of moving up and down is disposed inside the sleeve, a pressure continuation chamber is defined on a top of the pressure continuation sealing seat, and a first small passage is formed between the pressure continuation chamber and the transverse passage, the pressure continuation spring is supported between the pressure continuation spring seat and the pressure continuation sealing seat, driving the pressure continuation sealing seat to move upward so as to continuously extrude liquid in the pressure continuation chamber out to the transverse passage. A recess is formed inside the main body over the sleeve and facing the vertical passage, the top of the pressure continuation sealing seat is located inside the recess, the pressure continuation chamber is defined between a top surface of the recess and the top of the pressure continuation sealing seat; a gap exists between a periphery of the pressure continuation sealing seat and an inner wall of the recess of the main body which is defined as the first small passage.

As an improvement, the bottom of the pressure continuation sealing seat is located inside the sleeve, and a sealing ring sleeved outside a periphery of the pressure continuation sealing seat resists against an inner annular wall of the sleeve; the sleeve has a transverse protrusion for connecting the pressurization valve extending from a top of the sleeve into the transverse passage, and the vertical passage is defined between the periphery of the sleeve and an inner wall of the main body.

Preferably, the pressurization valve is a one-way valve and comprises a pressurization valve seat and a pressurization valve body, the pressurization valve seat is disposed at a position where a rear end of the transverse passage communicates with the vertical passage, the pressurization valve seat has liquid inlet holes at a rear end of the pressurization valve seat and one or more liquid outlet holes at a middle of the pressurization valve seat; the pressurization valve body is a silicon rubber case and is sleeved on the pressure valve seat to close the one or more liquid outlet holes, a second small passage communicating with the pressure continuation chamber is defined between the periphery of the pressurization valve body and the transverse passage.

Preferably, the pump has external threads on an outer periphery of the pump for threading to a bottom of the main body, the pump has a connecting socket for receiving the sucker; the main operating valve is a one-way ball valve and has a valve seat and a glass ball rotatably disposed inside the valve seat, the valve seat is disposed inside the pump over the connecting socket; the pressure continuation spring seat is a cylinder with certain elasticity, a bottom of the pressure continuation spring seat is located inside the pump and the top of the pressure continuation spring seat extends out of the pump and elastically blocks off the through hole of the cylinder, a third small passage for allowing liquid to flow into the cylinder is formed between the periphery of the pressure continuation spring seat and the inner wall of the pump.

Preferably, the cylinder is arranged transversely, the cylinder has an upper chamber defined as a liquid storage chamber and a lower chamber defined as an air return chamber, the cylinder has the through hole on a rear side of the liquid storage chamber for the liquid storage chamber communicating with the pump, and an air return hole on a rear side of the air return chamber; the main piston has an upper piston valve and a lower piston valve which are arranged transversely, the spring is supported between a rear inner wall of the liquid storage chamber and the upper piston valve; when the operating handle is pressed, the main piston moves toward the vertical passage, the main operating valve is closed and the pressurization valve is opened, so that liquid inside the liquid storage chamber enters the pressure continuation chamber and the transverse passage through the pressurization valve.

Preferably, the head cap is in threaded connection with a front end of the main body, a spray sheet is disposed inside the head cap; the spray one-way valve comprises a small valve, a small valve seat and a small valve seat cover covering the small valve seat, the small valve is disposed behind the spray sheet inside a chamber defined by the small valve seat and the small valve seat cover.

Preferably, an O-ring seal is disposed between the head cap and the main body, and the head cap has a jet aperture of 0.26 to 0.35 millimeters.

Preferably, the sleeve has a circular shape and is integrally connected to the main body.

Preferably, the pressure continuation sealing seat has a recessed chamber on a top of the pressure continuation sealing seat.

Finally, the operating handle has a supporting arm protruding from a rear surface of the operating handle to the main piston, correspondingly, the main piston has an arc surface for the supporting arm to resist against.

Compared with the prior art, the spray head capable of spraying continuously of the present invention has the following advantages: the pump, the cylinder, the main piston, the pressurization valve, the pressure continuation spring and the pressure continuation sealing seat are disposed inside the main body. When the operating handle is pressed, the main piston moves toward the vertical passage, the main operating valve is closed and the pressurization valve is opened, so that liquid in the liquid storage chamber enters the transverse passage and the pressure continuation chamber through the pressurization valve. When the liquid in the pressure continuation chamber is accumulated to a certain volume, a pressure will be produced to press down the pressure continuation chamber. After stopping pressing the operating handle, the pressure continuation spring will continuously drive the pressure continuation sealing seat upward, so that the liquid in the pressure continuation chamber is continuously sprayed out from the head cap. The spray head of the present invention is simple and reasonable in structure, convenient to assemble, low in cost without additional housing disposed outside the main body, and good in universality, it can satisfy the requirement of continuous spraying, and can be matched with most bottles in the market.

DETAILED DESCRIPTION OF THE INVENTION

Figure 1:
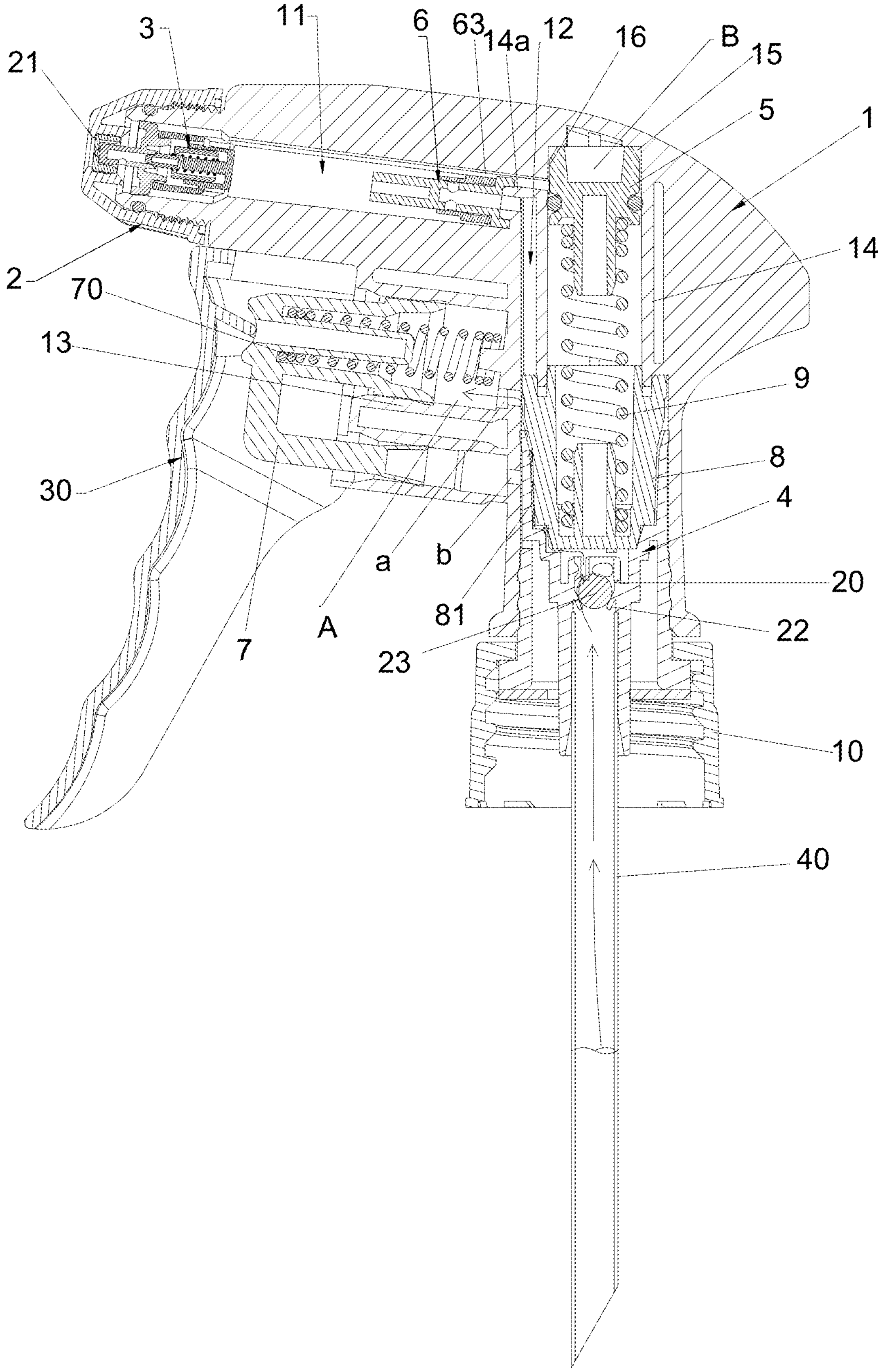
FIG. 1 is a sectional view of a spray head capable of spraying continuously according to an embodiment of the present invention (showing the liquid enters a liquid storage chamber)

The present invention will be further described below in detail by embodiments with reference to the accompanying drawings.

FIGS. 1-4 show a preferred embodiment of a spray head capable of spraying continuously the present invention. The spray head comprises a main body 1 having a liquid passage with an inlet and an outlet; a head cap 2 connected to the main body 1; a spray one-way valve 3 for discharging liquid; a pump 4; an operating handle 30; a cover 10 connected to the main body 1 for connecting to an external bottle. The liquid passage comprises a transverse passage 11 and a vertical passage 12 which communicate with each other. The head cap 2 is located at the outlet of the liquid passage which forms a front end of the transverse passage 11. The spray one-way valve 3 is located inside the front end of the transverse passage 11 and is adjacent to the head cap 2. The pressurization valve 6 is located inside the transverse passage 11 to make the vertical passage 12 communicate with the transverse passage 11. The pump 4 is disposed inside the main body 1 below a bottom of the vertical passage 12 and the cover 10 is connected to the pump 4. The cover 10 is located at the inlet of the liquid passage and a bottom of the vertical passage 12. The pump 4 has a main operating valve 20 and a spring seat 8 both disposed inside the pump 4. The main operating valve 20 is below the spring seat 8. The sucker 40 is connected to a bottom of the pump 4. The cylinder 13 is disposed inside the main body 1 below the transverse passage 11. A main piston 7 having an outer surface and an inner surface is transversely movably disposed on the cylinder 13. The operating handle 30 resists against the outer surface of the main piston 7. A spring 70 is supported between the inner surface of the main piston 7 and the cylinder 13 so as to move the main piston 7 forward and to resist against the operating handle 30. The cylinder 13 has a through hole a which communicates with the pump 4 and the vertical passage 12, similar to the structure of a three-way valve. The upper portion of the pressure continuation spring 9 is located inside the vertical passage 12 and the lower portion of the pressure continuation spring 9 is supported on the spring seat 8. A circular sleeve 14 having a bottom is disposed longitudinally inside the vertical passage 12 and behind the transverse passage 11, a top of the pressure continuation spring seat 8 is hermetically sleeved with the bottom of the sleeve 14. A pressure continuation scaling seat 5 capable of moving up and down is disposed inside the sleeve 14, a pressure continuation chamber B is defined on a top of the pressure continuation scaling seat 5. Generally, the top of the pressure continuation sealing seat 5 may also be recessed inward to form a larger pressure continuation chamber B so that the time for continuous spraying can be prolonged. A first small passage 16 is formed between the pressure continuation chamber B and the transverse passage 11, the pressure continuation spring 9 is supported between the pressure continuation spring seat 8 and the pressure continuation sealing seat 5, driving the pressure continuation sealing seat 5 to move upward so as to continuously extrude liquid in the pressure continuation chamber B out to the transverse passage 11. A recess 15 is formed inside the main body 1 over the sleeve 14 and facing the vertical passage 12. The top of the pressure continuation scaling seat 5 is located inside the recess 15. The pressure continuation chamber B is defined between a top surface of the recess 15 and the top of the pressure continuation scaling seat 5. A gap exists between a periphery of the pressure continuation sealing seat 5 and an inner wall of the recess 15 of the main body 1 which is defined as the first small passage 16.

More specially, the bottom of the pressure continuation sealing seat 5 is located inside the sleeve 14, and a sealing ring 50 sleeved outside a periphery of the pressure continuation scaling seat 5 resists against an inner annular wall of the sleeve 14; the sleeve 14 has a transverse protrusion **14*a* for connecting the pressurization valve 6 extending from a top of the sleeve 14 into the transverse passage 11, and the vertical passage 12 is defined between the periphery of the sleeve 14 and an inner wall of the main body 1. Generally, for the convenience of manufacturing, the sleeve 14 is integrally connected to the main body 1. The pressurization valve 6 is a one-way valve and comprises a pressurization valve seat 62 and a pressurization valve body 61. The pressurization valve seat 62 is disposed at a position where a rear end of the transverse passage 11 communicates with the vertical passage 12. The pressurization valve seat 62 has liquid inlet holes 621 at a rear end of the pressurization valve seat 62 and one or more liquid outlet holes 622 at a middle of the pressurization valve seat 62. The pressurization valve body 61 is a silicon rubber case and is sleeved on the pressure valve seat 62 to close the one or more liquid outlet holes 622. A second small passage 63 communicating with the pressure continuation chamber B is defined between the periphery of the pressurization valve body 61 and the transverse passage 11**.

The pump 4 has external threads on an outer periphery of the pump 4 for threading to a bottom of the main body 1, the pump 4 has a connecting socket 41 for receiving the sucker 40. The main operating valve 20 is a one-way ball valve and has a valve seat 22 and a glass ball 23 rotatably disposed inside the valve seat 22. The valve seat 22 is disposed inside the pump 4 over the connecting socket 41. The pressure continuation spring seat 8 is a cylinder with certain elasticity. A bottom of the pressure continuation spring seat 8 is located inside the pump 4 and the top of the pressure continuation spring seat 8 extends out of the pump 4 and elastically blocks off the through hole a of the cylinder 13. A third small passage 81 for allowing liquid to flow into the cylinder 13 is formed between the periphery of the pressure continuation spring seat 8 and the inner wall of the pump 4. The cylinder 13 is substantially arranged transversely, the cylinder 13 has an upper chamber defined as a liquid storage chamber A and a lower chamber defined as an air return chamber C. The cylinder 13 has the through hole a on a rear side of the liquid storage chamber A for the liquid storage chamber A communicating with the pump 4, and an air return hole b on a rear side of the air return chamber C. The air return hole b is used for maintaining the balance of pressure inside and outside the bottle. The main piston 7 has an upper piston valve 71 and a lower piston valve 72 which are arranged transversely, the spring 70 is supported between a rear inner wall of the liquid storage chamber A and the upper piston valve 71. In order to flexibly rotate the operating handle, the operating handle 30 has a supporting arm 301 protruding from a rear surface of the operating handle 30 to the main piston 7, correspondingly, the main piston 7 has an arc surface 73 for the supporting arm 301 to resist against. When the operating handle 30 is pressed, the main piston 7 moves toward the vertical passage 12, the main operating valve 20 is closed and the pressurization valve 6 is opened, so that liquid inside the liquid storage chamber A enters the pressure continuation chamber B and the transverse passage 11 through the pressurization valve 6. Finally, since a pressure will be produced inside the sleeve when the pressure continuation sealing seat 5 moves down, the man body 1 further has an exhaust hole 17 on the man body 1.

The head cap 2 is in threaded connection with a front end of the main body 1. An O-ring seal **2*a* is disposed between the head cap 2 and the main body 1. A spray sheet 21 is disposed inside the head cap 2. The head cap 2 has a jet aperture of 0.26 to 0.35 millimeters. The spray one-way valve 3 comprises a small valve 31. A small valve seat 32 and a small valve seat cover 33 covering the small valve seat 32. The small valve 31 is disposed behind the spray sheet 21 inside a chamber defined by the small valve seat 32 and the small valve seat cover 33. A lower valve spring 34 is supported between the small valve 31 and the small valve seat 32**.

The structure of the spray one-way valve 3 is the same as that in the prior art, and will not be specifically described here.

Figure 2:
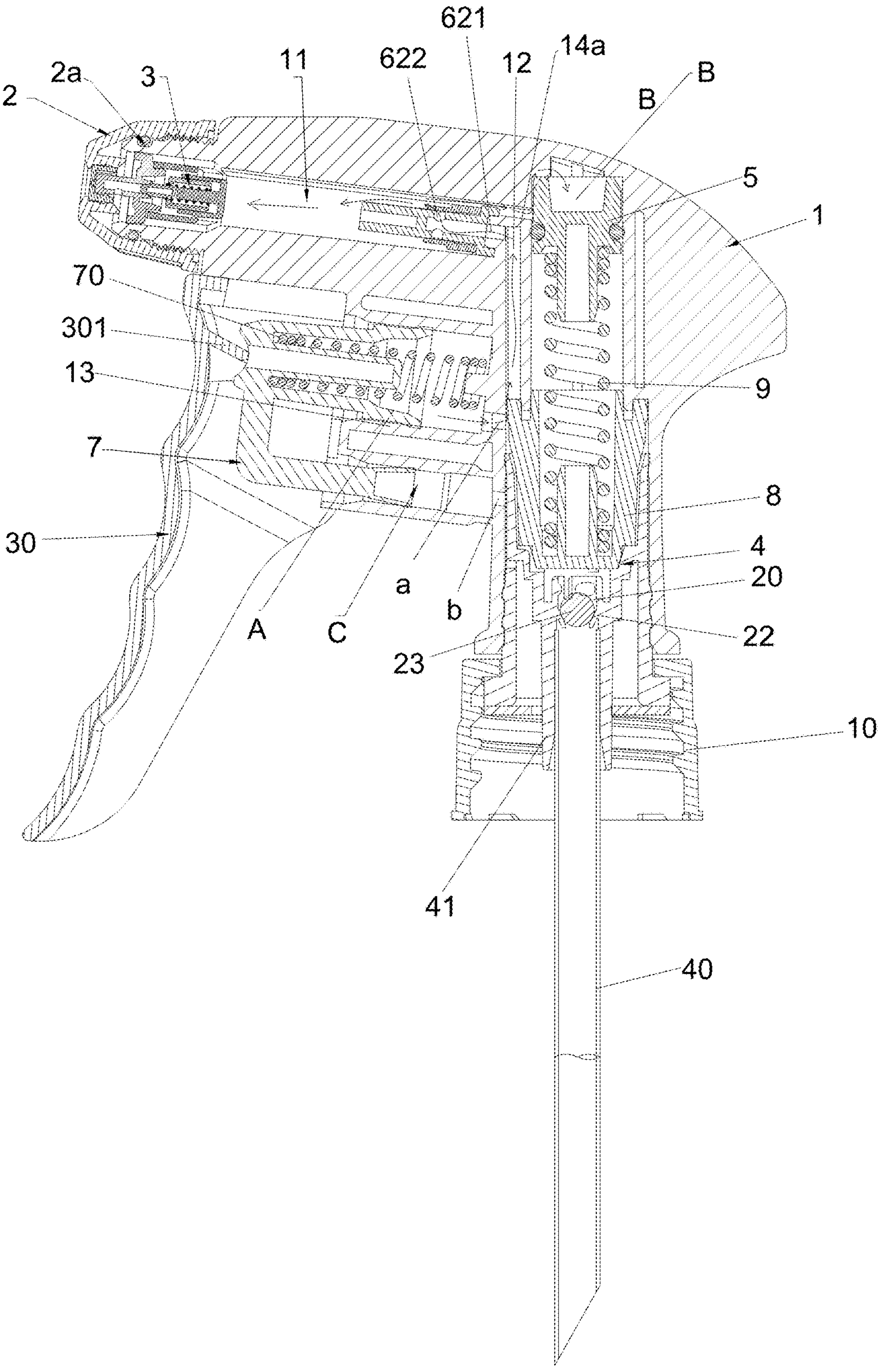
FIG. 2 is a sectional view of the spray head according to the embodiment of the present invention when the operating handle is pressed (showing the liquid in the liquid storage chamber enters a pressure continuation chamber)
Figure 3:
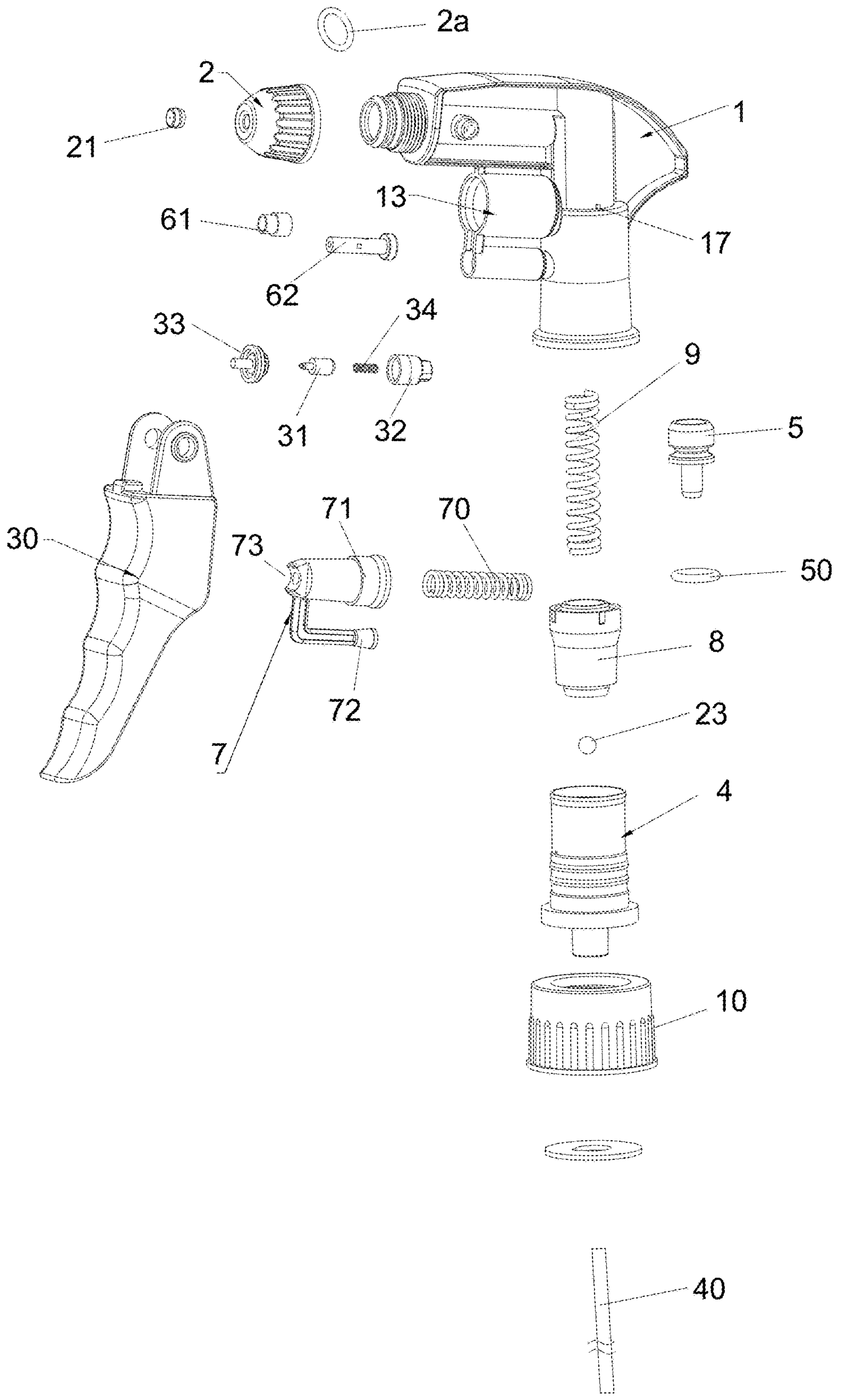
FIG. 3 is an exploded view of the spray head according to the embodiment of the present invention.
Figure 4:
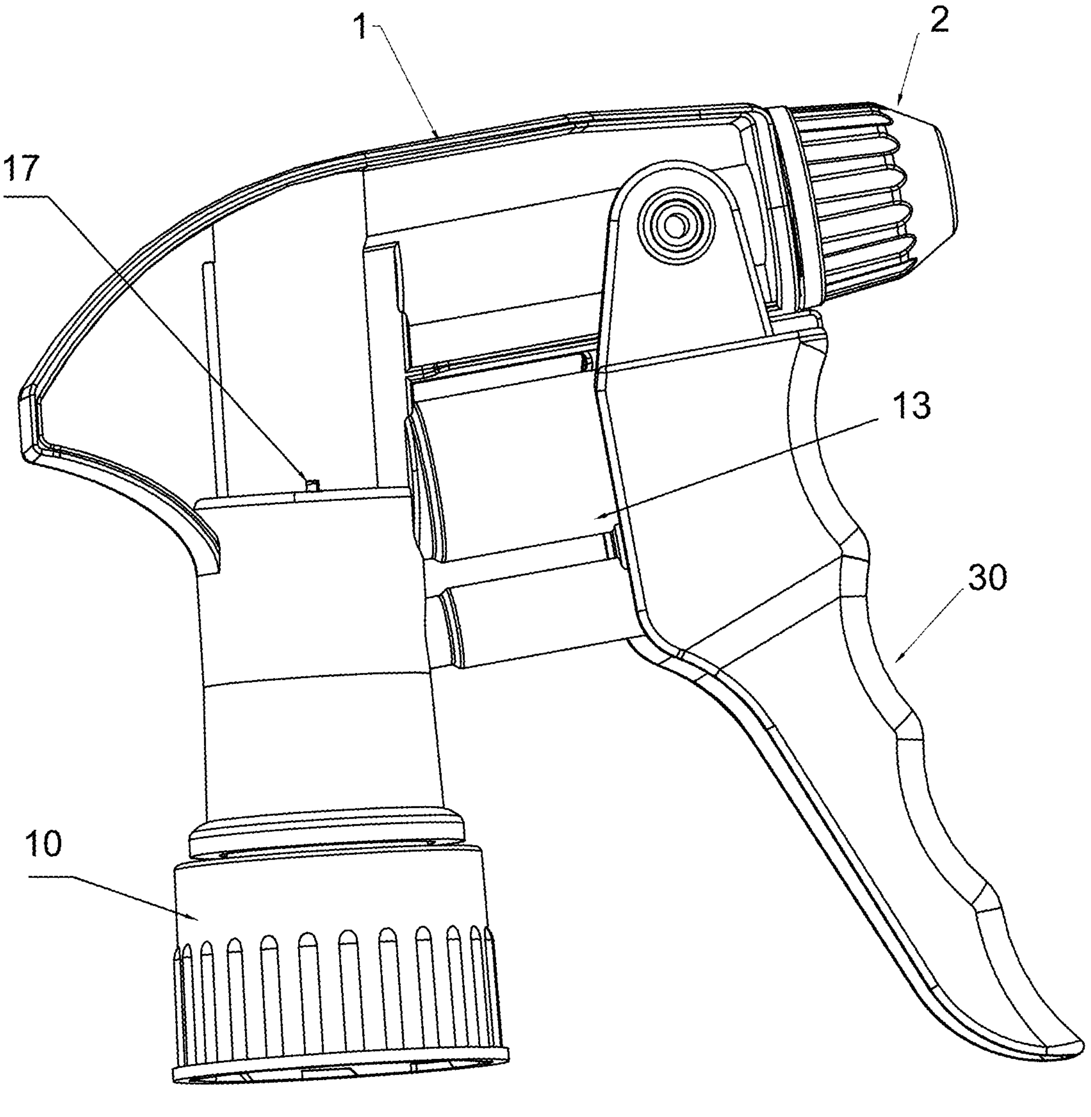
FIG. 4 is a perspective view of the spray head according to the embodiment of the present invention.

When in use, the operating handle 30 is pressed, the main piston 7 moves toward the vertical passage 12, the main operating valve 20 is closed and the pressurization valve 6 is opened. The volume of the liquid storage chamber A is decreased, so that the air pressure is increased. The liquid inside the liquid storage chamber A enters the pressure continuation chamber B and the transverse passage 11, as shown in FIG. 2. Since the pressurization valve 6 is a one-way valve, the liquid after entering the pressure continuation chamber B and the transverse passage 11 will not flow back.

When the liquid in the transverse passage 11 reaches a certain pressure, the spray one-way valve 3 is opened, and the liquid starts to be ejected from the head cap 2. Since the jet aperture of the head cap 2 is designed to be 0.26 to 0.35 millimeters, it takes some time T for pumping the liquid from the liquid storage chamber A to the transverse passage 11 in every operation, considering the volume of the transverse passage 11 and the size of the jet aperture of the head cap 2, it generally takes more than three times of the time T for the liquid in the transverse passage 11 to be fully ejected from the transverse passage 11 to the outside through the head cap 2. Therefore, during the operation, a large amount of the liquid will be accumulated in the transverse passage 11 and the pressure continuation chamber B and cannot be quickly ejected from the head cap 2. The liquid in the pressure continuation chamber B is accumulated to a certain volume and will produce a pressure to press down the pressure continuation sealing seat 5. After the operating handle 30 is stopped pressing, the pressure continuation spring 9 will continuously drive the pressure continuation sealing seat 5 upward, so that the liquid entering the transverse passage 11 and the pressure continuation chamber B is continuously ejected from the head cap 2.

When the pressure in the transverse passage 11 and the pressure continuation chamber B is reduced to a certain value, the small valve 31 moves downward under an action of the small valve spring 34 so as to close the spray one-way valve 3. When the operating handle 30 is reset under the action of the spring 70, the pressure in the liquid storage chamber A and the pump 4 is reduced, the main operating valve 20 will be opened instantly, and the pressurization valve 6 is closed, so that the liquid enters the liquid storage chamber A through the sucker 40, as shown in FIG. 1.

Since the transverse passage 11 in this embodiment is large in volume and the pressure continuation chamber B is defined on the top of the pressure continuation sealing seat 5, the requirement of long-time continuous spraying can be satisfied. It is unnecessary to additionally have a housing disposed outside the main body. The appearance of the product is the same as that of the traditional hand-held spray gun, and is light, convenient to assemble, low in cost, good in universality, and can be matched with most bottles in the market.

The protection scope of the present invention is not limited to each embodiment described in this description. Any changes and replacements made on the basis of the scope of the present invention patent and of the description shall be comprised in the scope of the present invention patent.

The invention claimed is:

1. A spray head capable of spraying continuously, comprising:

a main body having a liquid passage with an inlet and an outlet;

a head cap connected to the main body;

a spray one-way valve for discharging liquid;

an operating handle;

a cover connected to the main body for connecting to an external bottle;

a pump;

a pressurization valve;

a sucker;

a cylinder;

a pressure continuation spring having an upper portion and a lower portion;

wherein, the liquid passage comprises a transverse passage and a vertical passage which communicate with each other, the head cap is located at the outlet of the liquid passage which forms a front end of the transverse passage, the spray one-way valve is located inside the front end of the transverse passage and is adjacent to the head cap, the pressurization valve is located inside the transverse passage to make the vertical passage communicate with the transverse passage;

the pump is disposed inside the main body below a bottom of the vertical passage and the cover is connected to the pump, the pump has a main operating valve and a spring seat both disposed inside the pump, the main operating valve is below the spring seat, the sucker is connected to a bottom of the pump;

the cylinder is disposed inside the main body below the transverse passage, a main piston having an outer surface and an inner surface is transversely movably disposed on the cylinder, the operating handle resists against the outer surface of the main piston, a spring is supported between the inner surface of the main piston and the cylinder so as to move the main piston forward and to resist against the operating handle, the cylinder has a through hole which communicates with the pump and the vertical passage;

the upper portion of the pressure continuation spring is located inside the vertical passage and the lower portion of the pressure continuation spring is supported on the spring seat;

a sleeve having a bottom is disposed inside the vertical passage and behind the transverse passage, a top of the pressure continuation spring seat is hermetically sleeved with the bottom of the sleeve;

a pressure continuation sealing seat capable of moving up and down is disposed inside the sleeve, a pressure continuation chamber is defined on a top of the pressure continuation sealing seat, and a first small passage is formed between the pressure continuation chamber and the transverse passage, the pressure continuation spring is supported between the pressure continuation spring seat and the pressure continuation sealing seat, driving the pressure continuation sealing seat to move upward so as to continuously extrude liquid in the pressure continuation chamber out to the transverse passage.

2. The spray head of claim 1, wherein a recess is formed inside the main body over the sleeve and facing the vertical passage, the top of the pressure continuation sealing seat is located inside the recess, the pressure continuation chamber is defined between a top surface of the recess and the top of the pressure continuation sealing seat;

a gap exists between a periphery of the pressure continuation sealing seat and an inner wall of the recess of the main body which is defined as the first small passage.

3. The spray head of claim 1, wherein the bottom of the pressure continuation sealing seat is located inside the sleeve, and a sealing ring sleeved outside a periphery of the pressure continuation sealing seat resists against an inner annular wall of the sleeve;

the sleeve has a transverse protrusion for connecting the pressurization valve extending from a top of the sleeve into the transverse passage, and the vertical passage is defined between the periphery of the sleeve and an inner wall of the main body.

4. The spray head of claim 3, wherein the pressurization valve is a one-way valve and comprises a pressurization valve seat and a pressurization valve body, the pressurization valve seat is disposed at a position where a rear end of the transverse passage communicates with the vertical passage, the pressurization valve seat has liquid inlet holes at a rear end of the pressurization valve seat and one or more liquid outlet holes at a middle of the pressurization valve seat;

the pressurization valve body is a silicon rubber case and is sleeved on the pressure valve seat to close the one or more liquid outlet holes, a second small passage communicating with the pressure continuation chamber is defined between the periphery of the pressurization valve body and the transverse passage.

5. The spray head of claim 4, wherein the pump has external threads on an outer periphery of the pump for threading to a bottom of the main body, the pump has a connecting socket for receiving the sucker;

the main operating valve is a one-way ball valve and has a valve seat and a glass ball rotatably disposed inside the valve seat, the valve seat is disposed inside the pump over the connecting socket;

the pressure continuation spring seat is a cylinder with certain elasticity, a bottom of the pressure continuation spring seat is located inside the pump and the top of the pressure continuation spring seat extends out of the pump and elastically blocks off the through hole of the cylinder, a third small passage for allowing liquid to flow into the cylinder is formed between the periphery of the pressure continuation spring seat and the inner wall of the pump.

6. The spray head of claim 1, wherein the cylinder is arranged transversely, the cylinder has an upper chamber defined as a liquid storage chamber and a lower chamber defined as an air return chamber, the cylinder has the through hole on a rear side of the liquid storage chamber for the liquid storage chamber communicating with the pump, and an air return hole on a rear side of the air return chamber;

the main piston has an upper piston valve and a lower piston valve which are arranged transversely, the spring is supported between a rear inner wall of the liquid storage chamber and the upper piston valve;

when the operating handle is pressed, the main piston moves toward the vertical passage, the main operating valve is closed and the pressurization valve is opened, so that liquid inside the liquid storage chamber enters the pressure continuation chamber and the transverse passage through the pressurization valve.

7. The spray head of claim 1, wherein the head cap is in threaded connection with a front end of the main body, a spray sheet is disposed inside the head cap;

the spray one-way valve comprises a small valve, a small valve seat and a small valve seat cover covering the small valve seat, the small valve is disposed behind the spray sheet inside a chamber defined by the small valve seat and the small valve seat cover.

8. The spray head of claim 7, wherein an O-ring seal is disposed between the head cap and the main body, and the head cap has a jet aperture of 0.26 to 0.35 millimeters.

9. The spray head of claim 1, wherein the sleeve has a circular shape and is integrally connected to the main body.

10. The spray head of claim 1, wherein the pressure continuation sealing seat has a recessed chamber on a top of the pressure continuation sealing seat.

11. The spray head of claim 1, wherein the operating handle has a supporting arm protruding from a rear surface of the operating handle to the main piston, correspondingly, the main piston has an arc surface for the supporting arm to resist against.

* * * * *